Sept. 1, 1925.

M. R. KARGE ET AL 1,551,670

FRICTION CLUTCH MECHANISM

Filed Nov. 27, 1920    2 Sheets-Sheet 1

INVENTORS.

BY

ATTORNEYS.

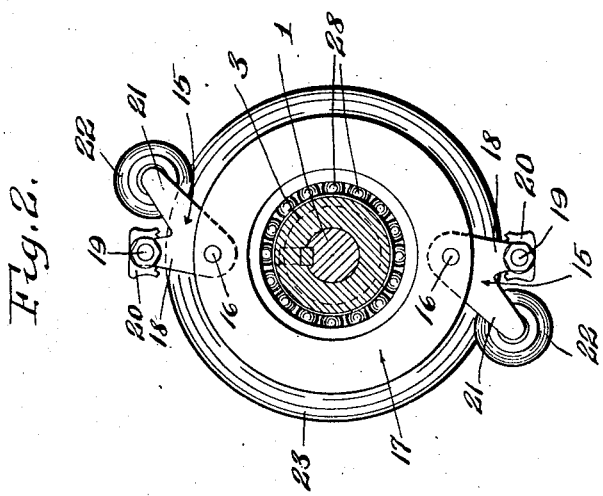

Patented Sept. 1, 1925.

1,551,670

UNITED STATES PATENT OFFICE.

MAXWELL R. KARGE AND FERNAN O. CONILL, OF PHOENIX, NEW YORK.

FRICTION-CLUTCH MECHANISM.

Application filed November 27, 1920. Serial No. 426,843.

*To all whom it may concern:*

Be it known that we, MAXWELL R. KARGE and FERNAN O. CONILL, citizens of the United States and the Republic of Cuba, respectively, and residents of Phoenix, in the county of Oswego and State of New York, have invented a certain new and useful Friction-Clutch Mechanism, of which the following is a specification.

This invention has for its object a friction clutch mechanism in which the driving torque is transmitted to the driven element or shaft through a flexible power transmitting element as a coiled spring which is progressively brought into operation during the connecting or friction clutching of the driven element to the driving element, which clutch mechanism is particularly simple in construction and highly efficient and durable in use. The invention consists in the novel features and in the combinations and constructions hereinafter set forth and claimed.

In describing this invention, reference is had to the accompanying drawings in which like characters designate corresponding parts in all the views.

Figure 2 is a sectional view on line 2—2, Fig. 1, looking to the left.

Figure 1:
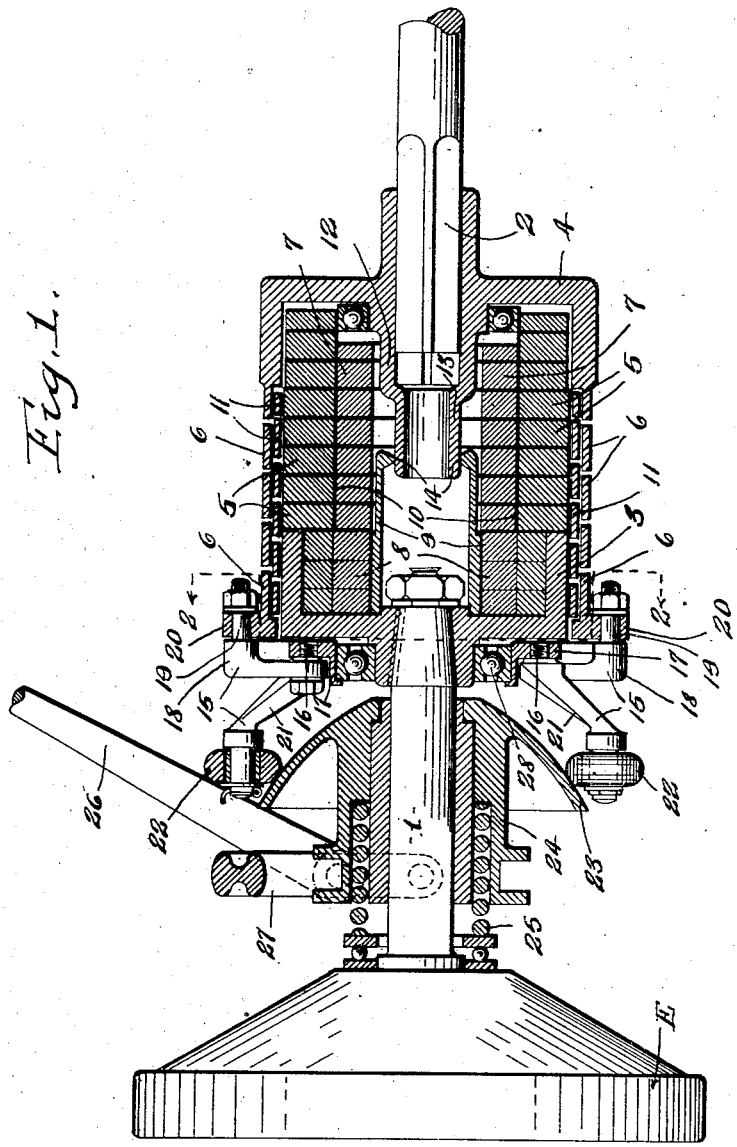
Figure 1 is a longitudinal sectional view, partly in elevation, of a preferable form of my clutch mechanism.

This friction clutch mechanism comprises generally, driving and driven members, a coupling connecting said members, headers mounted on said elements respectively, flexible motion transmitting means between the headers and being fixed to one of the headers and normally disconnected from the other header and means for frictionally connecting the latter header to the flexible power transmitting means. The connecting means is here shown as manually controlled.

1 and 2 are respectively, the driving and driven elements which for convenience are referred to throughout the specification and claims as driving and driven shafts as they are shafts in most constructions.

3 and 4 are respectively the headers of the coupling, these parts being also called headers for convenience.

The headers 3, 4 are secured to the shafts 1 and 2 to rotate therewith in any suitable manner, and the header 4 is connected to the driven shaft 2 by a sliding connection to permit a sliding movement of the shaft 2 when the coupling is applied to the drive shaft of the motor vehicle.

In this embodiment of our invention, there are shown two flexible power transmitting elements, one being connected to the driving header 3 and normally disconnected from the driven header 4 and the other being secured to the driven header 4 and normally disconnected from the driving header 3, these power transmitting elements being arranged substantially concentric with the axis of the coupling and one element being arranged outside of and enclosing the other and the outer being arranged to contract on the inner usually against suitable wearing parts between the elements. Although we have shown, two flexible power transmitting elements, one only, in some instances may be employed.

5 and 6 designate respectively, the flexible power transmitting elements, the element 5 being in the form of a torsion spring of the form shown in the Patent No. 1,387,726, August 16, 1921, of Maxwell R. Karge, the coil 5 at one end being reduced in thickness and secured in the header 3 in any well known manner, and the other end of the coil extending in the header 4, but being unsecured thereto.

A coiled element 7 is arranged within the element 5 with its end coils 8 between the end coils of the spring 5 and a sleeve 9 within the header 3, this sleeve being secured to the header and rotatable therewith. The end coils 8 of the element 7 and also the overlying end coils of the spring 5 are secured to the header 3 by shrinking the angular wall of the header on the peripheries of the coils of the spring 5, hence compressing these coils and the coils 8 of the element 7 onto the sleeve 9. Suitable clearance 10 is provided between the spring 5 and the element 7 to permit a limited contracting action of the spring 5.

This coiled element 7 is secured to one header as 3 and is not necessarily a spring but may act merely as a mandrel on which the spring 5 contracts, but is preferably coiled for permitting the coupling to have a universal joint movement.

The flexible power transmitting element 6 is secured at one end to the header 4 in any suitable manner, it being preferably formed integral therewith or welded thereto and encloses the spring 5 and the periphery of the header 3. As here shown, suitable wearing plates as brass coils 11 are interposed between the elements 5 and 6 and between the element 6 and the periphery of the header 3. The header 4 is shown as provided with a hub 12 having an extension 13 projecting into the end of the sleeve 9 and engaging the annular fulcrum 14 in the sleeve 9 as in the pending application of Maxwell R. Karge, Ser. No. 391,068, filed June 23, 1920.

Instead of the spring 5 any element may be provided against which the contracting force of the spring 6 is applied. However, in order to secure greatest efficiency and flexibility the spring 5 is preferably employed.

The means for connecting the driven header 4 to the driving header 3 through the flexible power transmitting means, that is, the means for contracting the spring 6 on the spring 5 and header 3 comprises one or more motion transmitting parts carried by and rotatable with the driving header 3 and having movement relatively thereto which movement effects the contracting action of the spring 6, and manual means for effecting the movement of said parts relatively to the driving header.

These parts are here shown as angle levers 15 pivoted at their angles 16 to a ring 17 mounted adjacent the header 3, one arm 18 of the lever being secured by a pivot 19 to an annular flange 20 fixed to the end coil of the spring 6, and the other arm 21 extending outwardly away from the header 3 and having a roller 22 thereon coacting with an expander or cone 23 on a sleeve 24 slidable lengthwise of the driving shaft 1 and being urged in one direction by a spring 25 and in the other direction to carry the cone 23 out of engagement with the rollers 22 by a foot lever 26 connected in any suitable manner through the yoke 27 to the sleeve or hub 24 of the cone. The ring 17 is mounted on bearings 28 interposed between the ring and the hub of the header 3. The sleeve 24 is suitably connected to the shaft 1 to rotate therewith, so that the shaft 1, sleeve 24 and spring 25 rotate as a unit. As here illustrated, the sleeve 24 is not mounted directly on the shaft 1 but is shrunk on or keyed to a sleeve mounted directly on the shaft 1 which sleeve rotates with the shaft 1 and is secured thereto in any suitable manner as by a key or spline. The outer end of the hub or sleeve 24 is counterbored to form a socket for the inner end of the spring 25.

In operation, assuming that the driven shaft is connected to a load as a driving axle of an automobile and that the driving shaft 1 is actuated by the engine of the vehicle, the fly wheel of which is designated E. Upon starting of the vehicle with the transmission gearing thereof shifted into low gear, the lever 26 is held in such position that the cone 23 is in off position, that is, disengaged from the rollers 22. Upon release of the lever 26 so that the cone 23 is free to be moved by the spring 25 rearwardly or to the right in Fig. 1 the cone moves the levers 21 about their axis 16 and as there is a resistance or load on the driven shaft 2 such movement of the levers is transmitted to the spring 6 causing it to contract gradually and bind on the spring 5 which in turn begins to contract or torque or tension and gradually, frictionally and yieldingly connect the driven header 4 to the driving header 3. When the friction is greater than the load the vehicle will begin to move forward. By reason of this friction clutch or coupling, the gears and other mechanism are relieved of violent starting shocks.

What we claim is:

1. In a friction clutch mechanism, the combination of driving and driven shafts, a coupling connecting the shafts comprising headers mounted on the shafts respectively, and torque transmitting means fixed to one header and extending into the other header, one of the headers being formed with a coiled torsion element enclosing the said means and the other header, and means for contracting the latter element toward such other header and said torque transmitting means thereby binding the headers together, substantially as and for the purpose specified.

2. In a friction clutch mechanism, the combination of driving and driven shafts, headers mounted respectively on the shafts, an element arranged between the headers and secured to one header and unsecured to the other, the driven header being provided with a flexible coiled element enclosing the former element and the driving header and arranged to contract toward the former element during movement of the driving header in one direction, a motion transmitting part connected to said flexible coiled element, and means for effecting movement of said part relatively to the driving header and the driven header to effect a contracting action of the coiled element, substantially as and for the purpose described.

3. In a friction clutch mechanism, the combination of driving and driven shafts, headers mounted respectively on the shafts, a coiled torsion spring fixed to the driving header, and extending into and being disconnected from the driven header, a second coiled torsion spring fixed to the driven header and enclosing the former spring and the driving header, a motion transmitting part having movement with and relatively to the driven header and being connected to one end of the torsion spring associated with the driven header and being movable relatively thereof, and means for effecting movement of said part relatively to the driven header, substantially as and for the purpose specified.

4. In a friction clutch mechanism, the combination of driving and driven shafts, headers mounted respectively on the shafts, a coiled torsion spring fixed to the driving header, and extending into and being disconnected from the driven header, a second coiled torsion spring fixed to the driven header and enclosing the former spring and the driving header, a motion transmitting part mounted to rotate relatively to the driving shaft and being connected to one end of the torsion spring associated with the driven header, and means for effecting movement of said part relatively to the driven header, said means including an expander mounted on and slidable lengthwise of the driving shaft and coacting with said part, substantially as and for the purpose set forth.

In testimony whereof, we have hereunto signed our names hereto at Syracuse, in the county of Onondaga, and State of New York, on the 30th day of October, 1920, and the 17th day of September, 1920, respectively.

MAXWELL R. KARGE.
FERNAN O. CONILL.